United States Patent [19]
Mullins et al.

[11] Patent Number: 5,805,202
[45] Date of Patent: Sep. 8, 1998

[54] AUTOMATIC VIDEO CABLE COMPENSATION SYSTEM

[75] Inventors: Christopher M. Mullins; Thomas J. Ray, both of Yonkers, N.Y.; John P. McDonough, Harrington Park, N.J.

[73] Assignee: Sensormatic Electronics Corporation, Deerfield Beach, Fla.

[21] Appl. No.: 545,951

[22] Filed: Oct. 20, 1995

[51] Int. Cl.⁶ .................................................. H04N 7/14
[52] U.S. Cl. .............................. 348/6; 348/143; 348/211; 348/571; 348/614
[58] Field of Search .................................. 348/6, 8, 143, 348/211, 212, 518, 571, 614; H04N 7/14

[56] References Cited

U.S. PATENT DOCUMENTS

| | | | |
|---|---|---|---|
| 3,568,100 | 3/1971 | Tarbox | 333/18 |
| 4,054,910 | 10/1977 | Chou | 348/6 |
| 4,222,066 | 9/1980 | Zelenz | 348/6 |
| 4,996,497 | 2/1991 | Waehner | 330/151 |
| 5,058,198 | 10/1991 | Rocci | 348/6 |
| 5,434,615 | 7/1995 | Matumoto | 348/518 |

*Primary Examiner*—Howard W. Britton
*Attorney, Agent, or Firm*—Robin, Blecker, Daley and Driscoll

[57] ABSTRACT

A video surveillance system includes a remotely controllable video camera which generates a video signal, a video switch, a cable for transmitting the video signal from the video camera to the video switch, a control circuit connected to the cable for generating control signals to be transmitted to the video camera via the cable, and a control signal receiver associated with the camera and connected to the cable for receiving the control signals transmitted via the cable. The control signal receiver includes a detection circuit for automatically detecting the length of the cable and generating an adjustment signal indicative of the detected length of the cable. The control signal receiver also includes an adjustable circuit element which is adjusted on the basis of the adjustment signal so as to compensate for the detected length of the cable. The automatic cable compensation in the control signal receiver provides reliable detection of the camera control signals. Automatic cable-length compensation of the video signal is also provided on the basis of the adjustment signal.

36 Claims, 6 Drawing Sheets

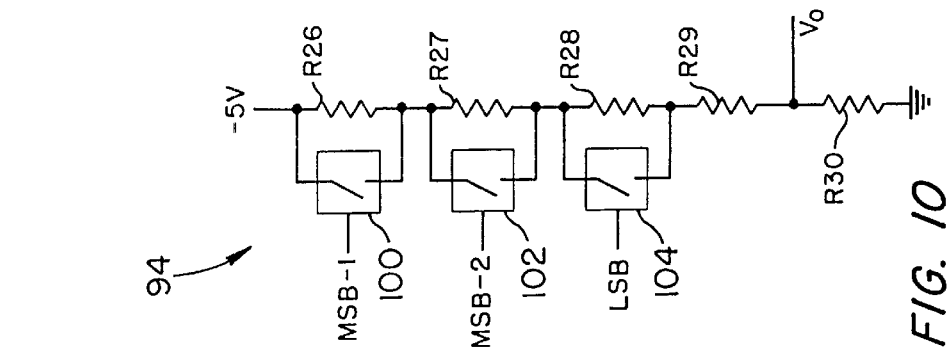
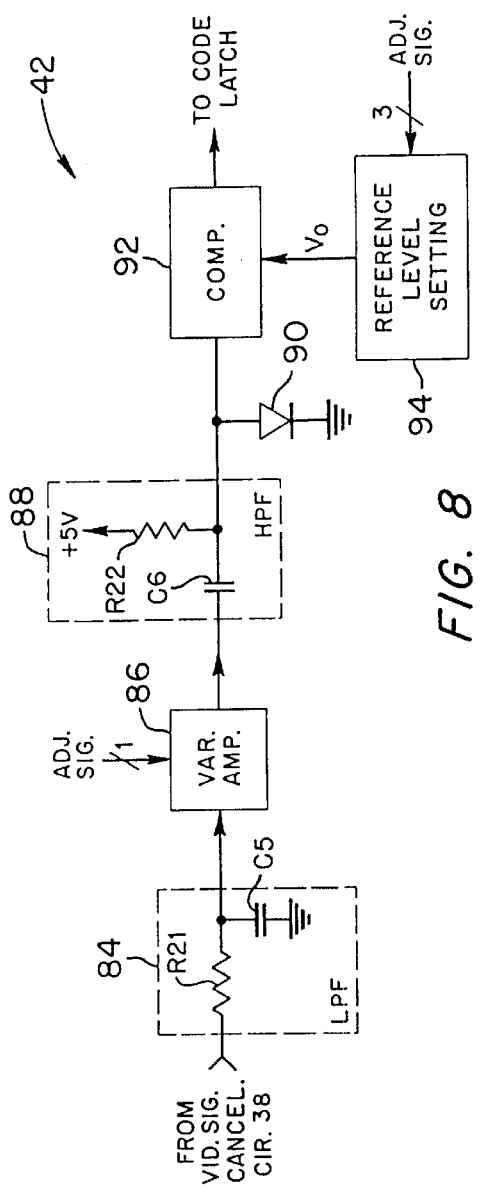
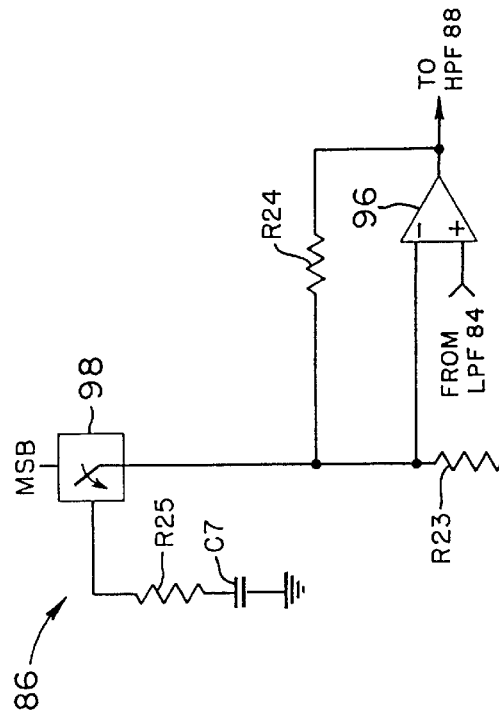

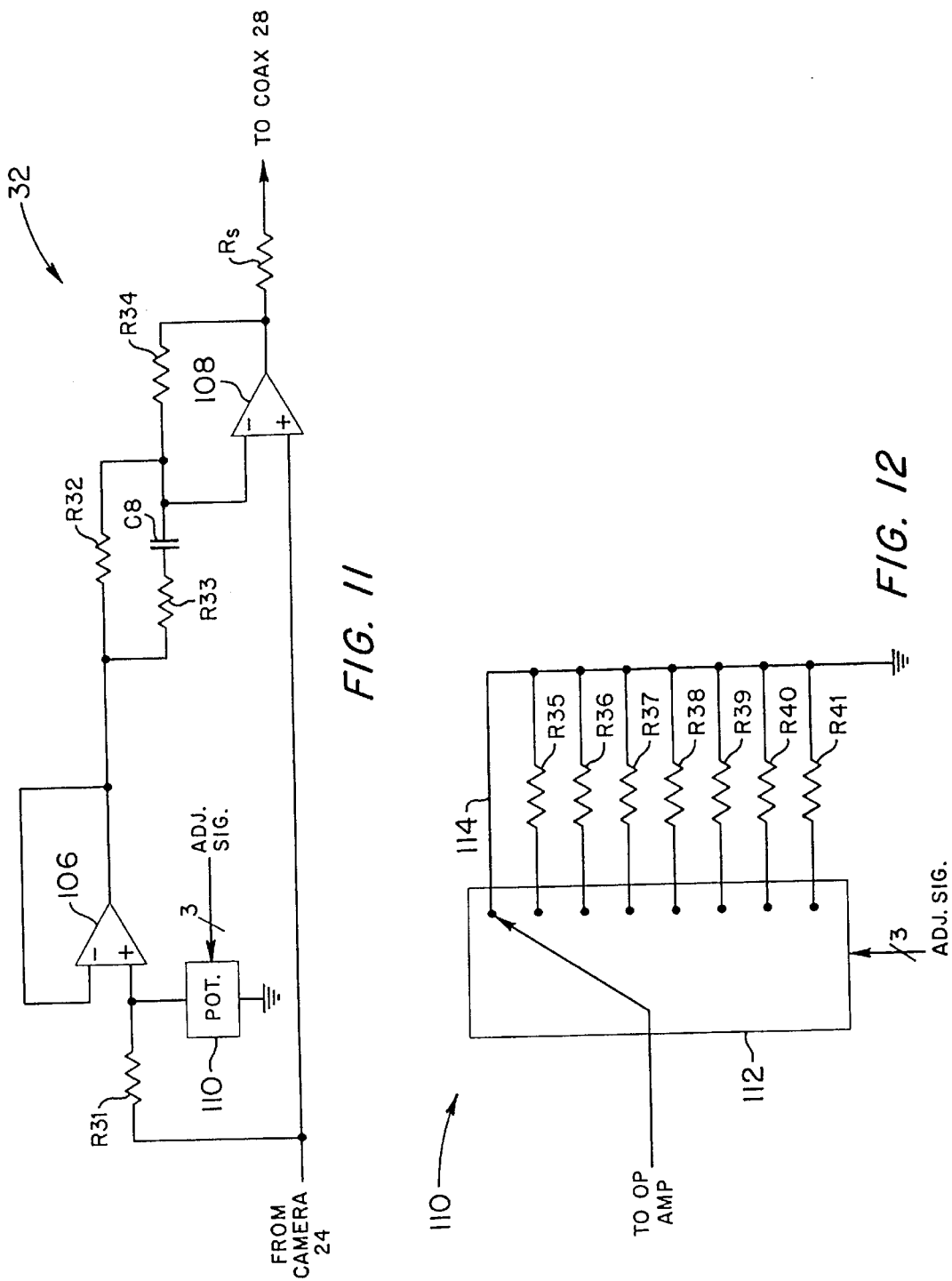

AUTOMATIC VIDEO CABLE COMPENSATION SYSTEM

FIELD OF THE INVENTION

This invention relates to closed-circuit television surveillance systems employing remotely-controllable video cameras, and, more particularly, to compensating for the effects of variations in the lengths of cable runs used in such systems.

BACKGROUND OF THE INVENTION

A problem encountered in closed-circuit television surveillance systems is that cables used to transmit video signals from remote cameras to a control console location at which video signals are switched, viewed on monitors, etc., generally are of various lengths, and variations in the length of the cable result in variations in the overall attenuation of the video signal as well as variations in frequency-dependent attenuation characteristics of the cable.

It has been known to attempt to compensate for such variations by manual adjustment of a number of variable circuit elements (typically variable resistors) in a signal compensation amplifier. These adjustments may be made, for example, based on a subjective viewing of a monitor which displays the video signal which has been transmitted through the cable. Such manual adjustments are difficult, time consuming and often fail to be performed satisfactorily.

U.S. Pat. No. 4,996,497, issued to Waehner and commonly assigned with this application, discloses a video compensation circuit in which adjustment of a single variable circuit provides compensation for attenuation, low frequency effects, and high frequency effects resulting from variations in cable length. The circuit disclosed in the '497 patent facilitates manual compensation adjustment, but an arrangement that is still more convenient would be desirable.

One possibility would be to provide relatively expensive broad-band cables for longer cable runs. However, the greater overall system cost that would result makes this alternative unattractive.

The need to compensate for cable distortion is particularly critical when the same cable which is used for transmission of video signals from the remote camera to the control location is also used for transmission of camera control signals from the control location to the remote camera. It is possible to avoid undesirable effects of cable distortion on the control signals by providing a separate cable for the control signals and transmitting the control signals at a high amplitude. However, providing a separate cable run for the control signals essentially doubles the cabling cost for the system.

Because of the unreliability of commonly used compensation techniques, runs of cable used for both video and control signals have commonly been limited to no more than 1000 feet. This is a substantial impediment to relative placement of the cameras and the control locations, since commonly used video coaxial cable, if used for video alone, can be effectively used up to a distance of about 3000 feet. Moreover, even with cable runs limited to 1000 feet, errors in compensation often prevent reliable receipt of the control signals at the camera.

OBJECTS AND SUMMARY OF THE INVENTION

It is accordingly an object of the invention to provide a system in which camera control signals are transmitted over the same cable used for video signals with greater reliability and over longer distances than in conventional systems.

It is a further object of the invention to provide more convenient compensation for the distortive effects of varying cable length on video signals transmitted in a closed-circuit television surveillance system.

According to an aspect of the invention, there is provided a video surveillance system which includes a remotely controllable video camera for generating a video signal, a video switch, a cable for transmitting the video signal from the video camera to the video switch, a control circuit connected to the cable for generating control signals to be transmitted to the video camera via the cable, and a control signal receive circuit operatively associated with the video camera and connected to the cable for receiving the control signals transmitted via the cable, and also provided in the system is an improvement including an adjustable circuit element in the control signal receive circuit, a detection circuit connected to the cable for detecting a characteristic of the cable and for generating an adjustment signal indicative of the detected characteristic of the cable, and a connection for applying the adjustment signal to the adjustable circuit element in the control signal receive signal so as to adjust the control signal receive circuit in accordance with the detected characteristic of the cable.

Further in accordance with this aspect of the invention, the control signal receive circuit may include a video signal cancellation circuit, with the video signal cancellation circuit including the adjustable circuit element. In addition, the detection circuit may receive a signal output from the video signal cancellation circuit and detect the characteristic of the cable on the basis of the signal output from the video cancellation circuit. Alternatively, the system provided in accordance with this aspect of the invention may also include an adjustable video signal compensation circuit, connected between the video camera and the cable, for receiving the adjustment signal generated by the detection circuit and compensating the video signal in accordance with the detected characteristic of the cable. Also, the adjustment signal generated by the detection signal may be a digital signal, and the control signals generated by the control circuit may include signals for controlling pan, tilt and zoom conditions of the video camera.

According to another aspect of the invention, there is provided a self-compensating video signal cancellation circuit, including a first input terminal for receiving a video signal at an input side of a cable source termination resistor, a second input terminal for receiving a video signal at an output side of the cable source termination resistor, an operational amplifier having a first input, a second input and an output, a first resistance connecting the first input of the operational amplifier to the first input terminal, a second resistance connecting the second input of the operational amplifier to the second input terminal, a third resistance connecting the output of the operational amplifier to one of the first and second inputs of the operational amplifier, an adjustable resistive network connected between ground and the other one of the first and second inputs of the operational amplifier, a detection circuit connected to the output of the operational amplifier for detecting a characteristic of a signal output from the operational amplifier and for generating an adjustment signal on the basis of the detected characteristic, and a connection for applying the adjustment signal to the adjustable resistive network to adjust a characteristic of the adjustable resistive network.

Further in accordance with the latter aspect of the invention, the first input of the operational amplifier may be its non-inverting input, in which case the second input of the operational amplifier is its inverting input, the third resistance connects the output of the operational amplifier to its second input, and the adjustable resistive network is connected between ground and the first input of the operational amplifier. Further, the adjustment signal may be a digital signal and the adjustable resistive network may include a digital potentiometer to which the adjustment signal is applied. Moreover, the adjustable resistive network may include impedance translation circuitry associated with the digital potentiometer for translating an impedance level of the digital potentiometer, and the translation circuitry may include an operational amplifier and a feedback network connected to the digital potentiometer.

According to a further aspect of the invention, there is provided apparatus for automatic video signal compensation, including a video camera for generating a video signal, a cable through which the video signal is transmitted, a detection circuit connected to the cable for detecting the length of the cable on the basis of a signal coupled to the cable and for generating an adjustment signal, the adjustment signal being indicative of the detected length of the cable, and an adjustable compensation circuit for compensating the video signal in accordance with the adjustment signal generated by the detection circuit.

Further in accordance with this aspect of the invention, the adjustable compensation circuit may include a digital potentiometer, in which case the adjustment signal generated by the detection circuit is a digital signal which is applied to the digital potentiometer. Also, the detection circuit may include a video signal cancellation circuit connected to receive a first signal present on a first side of the source termination resistor connected to the cable and a second signal present on a second side of the source termination resistor, with the video signal cancellation circuit outputting a signal indicative of a difference between the first and second signals, and the adjustment signal being generated on the basis of the signal output from the video signal cancellation circuit. The video signal cancellation circuit may include an adjustable resistive network with the adjustment signal being applied to the adjustable resistive network to adjust a characteristic of the adjustable resistive network.

According to still a further aspect of the invention there is provided apparatus for automatic video signal compensation, including a video camera for generating a video signal, a cable through which the video signal is transmitted, a video signal cancellation circuit connected to receive a first signal present on a first side of the source termination resistor connected to the cable and a second signal present on a second side of the source termination resistor, with the video signal cancellation circuit outputting a signal indicative of a difference between the first and second signals, adjustment signal circuitry for generating the adjustment signal supplied to the compensation circuit on the basis of the signal outputted by the video signal cancellation circuit, and an adjustable compensation circuit for compensating the video signal in accordance with the adjustment signal generated by the adjustment signal circuitry.

Further in accordance with the latter aspect of the invention, the adjustable compensation circuit may include a digital potentiometer, in which case the adjustment signal generated by the adjustment signal circuitry is a digital signal which is applied to the digital potentiometer. Also, the video signal cancellation circuit may include an adjustable resistive network, in which case the adjustment signal is applied to the adjustable resistive network to adjust a characteristic of the adjustable resistive network.

According to still another aspect of the invention, there is provided an apparatus for receiving camera control code signals in a video surveillance system in which video signals and the camera control signals are transmitted in opposite directions through a single cable, with the apparatus including a video signal cancellation circuit connected to receive a first signal present on a first side of the source termination resistor connected to the cable and a second signal present on a second side of the source termination resistor, the video signal cancellation circuit outputting a difference signal indicative of a difference between the first and second signals and including an adjustable resistive network for adjusting a characteristic of the video cancellation circuit; a cable characteristic determination circuit for receiving the difference signal outputted by the video cancellation circuit, determining a characteristic of the cable on the basis of the difference signal, and generating an adjustment signal on the basis of the difference signal, the adjustment signal being applied to the adjustable resistive network of the video cancellation circuit so as to adjust the resistive network according to the determined characteristic of the cable; and a code detection circuit for receiving the difference signal output from the video signal cancellation circuit and processing the difference signal to detect the camera control code signals transmitted through the cable.

Further in accordance with this aspect of the invention, the video signal cancellation circuit may include an operational amplifier configured as a differential amplifier for forming the difference signal from the first and second signals and having the adjustable resistive network connected to an input of the operational amplifier. Also, the adjustment signal may be a digital signal, in which case the adjustable resistive network includes a digital potentiometer to which the adjustment signal is applied and impedance translation circuitry associated with the digital potentiometer for translating an impedance level of the digital potentiometer, with the translation circuitry including an operational amplifier and a feedback network connected to the digital potentiometer.

Further, the cable characteristic determination circuit may include processing circuitry for processing the difference signal outputted by the video cancellation circuit to form a processed difference signal, comparison circuitry for comparing the processed difference signal with a reference level and for forming a comparison signal indicative of a result of the comparison, and a digital counter for forming the adjustment signal in response to the comparison signal formed by the comparison circuitry. In addition, the cable characteristic determination circuit may further include level variation circuitry associated with the comparison circuitry for receiving the adjustment signal and varying the reference level in accordance with the adjustment signal.

Moreover, the code detection circuit may include a processing circuit for processing the difference signal outputted by the video cancellation circuit to form a processed difference signal, and a comparison circuit for comparing the processed difference signal with a reference level to detect bits constituting the camera control code signals. The adjustment signal may be a multi-bit digital signal and the processing circuit included in the code detection circuit may include a variable amplifier for applying to the difference signal a gain selected from a predetermined plurality of gains on the basis of at least one bit of the multi-bit digital signal, with the code detection circuit further including a level variation circuit associated with its comparison circuit for receiving at least one other bit of the multi-bit digital signal and varying the reference level in accordance with the at least one other bit of the multi-bit digital signal.

According to yet another aspect of the invention, there is provided a method of compensating for variations in cable length in a closed-circuit video surveillance system, including the steps of providing an adjustable video signal compensation circuit connected between a video camera and a cable through which video signals generated by the camera are transmitted, connecting to the cable a detection circuit for detecting a characteristic of the cable, generating an adjustment signal in the detection circuit, and applying the adjustment signal to the adjustable video signal compensation circuit.

According to the latter aspect of the invention, the adjustment signal may be a digital signal indicative of the length of the cable, and the generating step may include receiving the video signals generated by the camera.

According to still a further aspect of the invention, there is provided a method of receiving a camera control signal transmitted to a video camera through a cable used for transmission of a video signal generated by the camera, with the method including the steps of receiving a first signal which includes both the video signal and the camera control signal, detecting a characteristic of the cable, adjusting a differential amplifier on the basis of the detected characteristic of the cable, and subtracting the first signal from the second signal by means of the adjusted differential amplifier. Further in accordance with this aspect of the invention, the detecting step may include processing the first signal, with the processing of the first signal including subtracting the first signal from the second signal to form a third signal. Moreover, the detecting step may include detecting whether the third signal is at a positive potential level or a negative potential level. The detecting step may include detecting a length of the cable.

The foregoing and other objects and features of the invention will be further understood from the following detailed description of preferred embodiments and practices thereof and from the drawings, wherein like reference numerals identify like components and parts throughout.

DESCRIPTION OF THE DRAWINGS

FIGS. 5A and 5B show details of a variable resistance circuit which constitutes a portion of the circuit of FIG. 4.

FIG. 8 is a block diagram of a code detection circuit that constitutes a portion of the circuit of FIG. 3.

FIG. 9 shows details of a variable amplifier that is part of the circuit of FIG. 8.

FIG. 10 shows details of a reference level setting circuit that is part of the circuit of FIG. 8.

FIG. 11 is a schematic representation of a video signal compensation circuit which constitutes a portion of the circuit shown in FIG. 2.

FIG. 12 shows details of a potentiometer that constitutes a portion of the circuit of FIG. 11.

DESCRIPTION OF PREFERRED EMBODIMENTS

Figure 1:
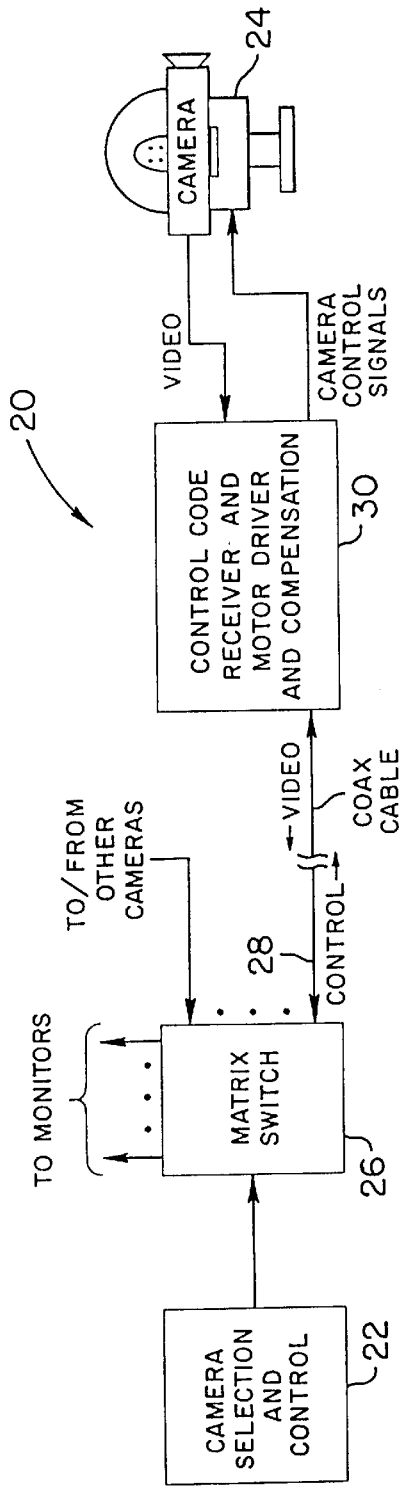
FIG. 1 is a simplified block diagram of a closed-circuit video surveillance system in which the present invention is applied.

A closed circuit video surveillance system (generally represented by reference number 20) is shown in FIG. 1 in simplified block diagram form. The major components of the system 20 include a system control device 22 and a number of video cameras, of which only a camera 24 is explicitly shown. The system 20 also includes a number of monitors, which are not shown, and a matrix switch 26 for routing video signals from cameras selected through the control device 22 so that the video signals from the selected cameras are displayed on monitors which are also selected through the control device 22. The cameras, including camera 24, are connected to the video switch 26 by means of coaxial cables, of which only a cable 28 associated with the camera 24 is explicitly shown in the drawing.

The camera 24 is preferably of the conventional type in which the direction of view of the camera, as well as the camera's zoom condition, can be changed by remote control. In particular, control signals, typically including pan, tilt and zoom signals are transmitted to the camera 24, and in response to the control signals received at the camera, motors are controlled to change the pan, tilt and zoom conditions of the camera.

A control code receiver and motor driver circuit 30 is provided, in accordance with the invention, between the camera 24 and the coax cable 28. Video signals generated by the camera 24 are output from the camera 24 to the circuit 30, which in turn couples the video signals to the coax cable 28 for transmission to the matrix switch 26. In addition, camera control signals generated at the control device 22 are coupled onto the coax cable 28 by the matrix switch 26 for transmission to the camera 24. More specifically, the control signals transmitted through the cable 28 from the matrix switch 26 are received and detected at the receiver circuit 30 and, after suitable conditioning, are transmitted from the receiver circuit 30 to control the motors (not separately shown) associated with the camera 24. As will also be seen, the receiver circuit 30 includes appropriate circuitry for compensating for losses and frequency dependent effects resulting from transmission of the video and control signals through the coax cable 28. It is to be understood that the length of the cable 28 is not known a priori.

Figure 2:
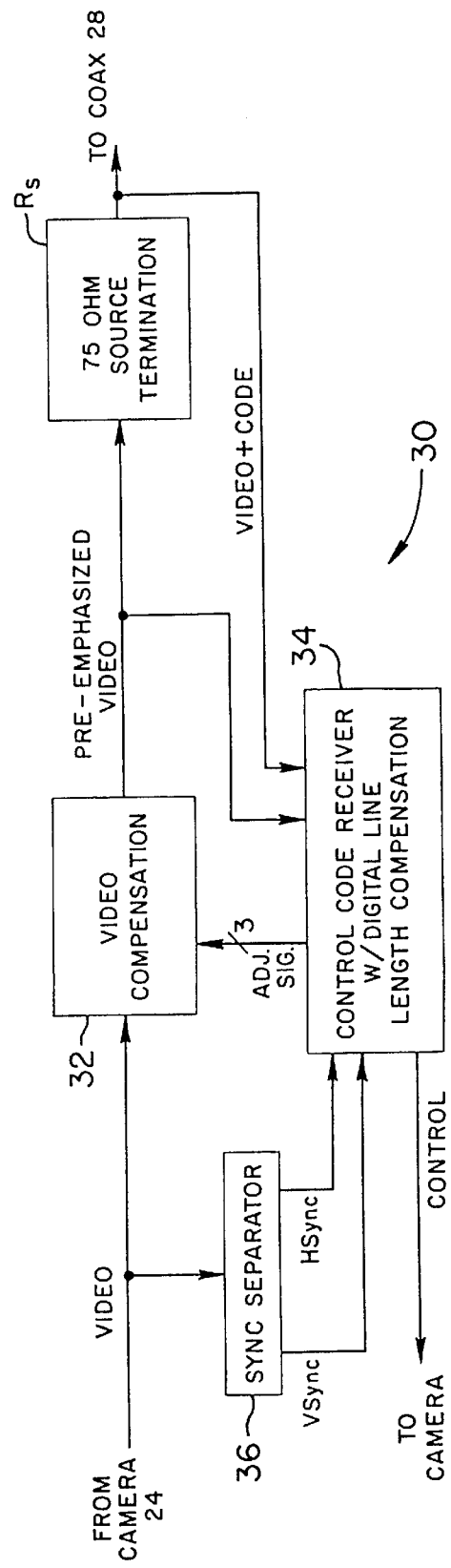
FIG. 2 is a high level block diagram representation of a control code receiver, motor driver and cable compensation circuit provided in accordance with the invention as part of the video surveillance system of FIG. 1.

FIG. 2 is a high-level block diagram of the code receiver circuit 30. The major components of the circuit 30 are a video compensation block 32 and a code receiver and cable length determination block 34. Also associated with the receiver circuit 30 is a synchronizing signal separating circuit 36 which receives the video signal generated by the camera 24 and separates vertical and horizontal synchronizing signals from the video signal. In addition, a 75 ohm source termination (designated by the reference character $R_s$) is provided to provide the correct source impedance for the coax cable 28. As will be seen, the control code receiver circuit 34 is connected to receive a pre-emphasized video signal present at the side of the source termination resistance $R_s$ which is toward the video compensation circuit 32, and is also connected to receive a signal on the coax cable side of the source termination resistance $R_s$. The latter signal includes both a video signal generated by the camera 24 as compensated by the video compensation circuit 32 and the control code signals originated by the control circuit 22 and transmitted to the receiver circuit 30 by way of the matrix switch 26 and the coax cable 28. In addition, the control code receiver block 34 receives the vertical and horizontal sync signals which were separated by the sync separator 36 from the video signal generated by the camera 24. On the basis of the signals respectively present at the two sides of the source termination resistance $R_s$ the control code receiver block 34 generates an adjustment signal which is a multi-bit digital signal. This signal (or more precisely, the three most significant bits of the signal) is provided from the control code receiver block 34 to the video compensation block 32 and is used to adjust the video compensation block 32 so that the video compensation block 32 properly compensates the video signal input thereto according to the detected length of the coax cable 28. The control code receiver block 34 also functions to detect the control code signal present in the signal at the coax cable side of the source termination resistance $R_s$ and the control signals detected by the code receiver block 34 are output from the code receiver block 34 to the camera 24 in order to control the movement, zoom condition, and so forth of the camera 24.

Figure 3:
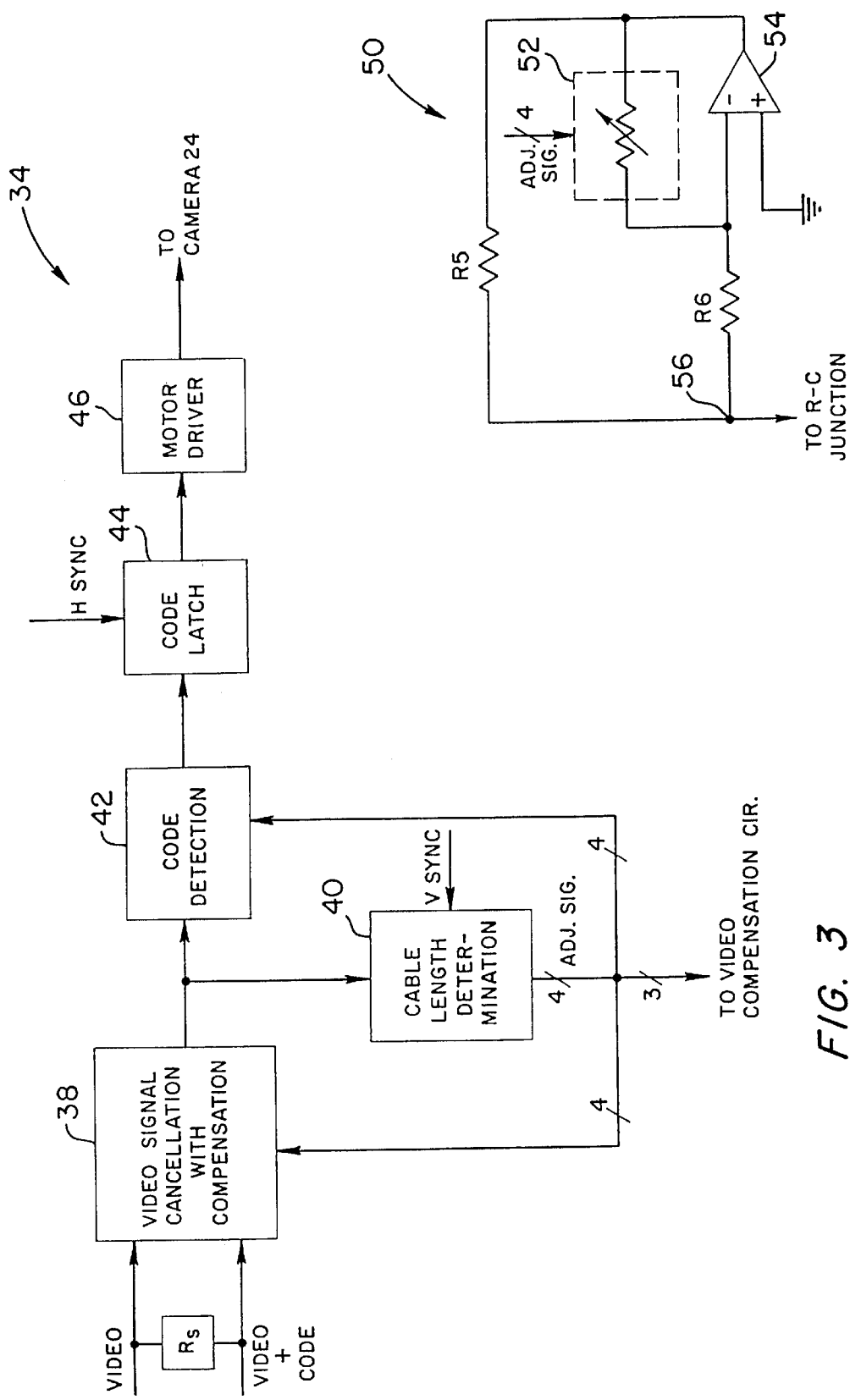
FIG. 3 is a block diagram of the control code receiver and cable length determination portions of the circuit of FIG. 2.

Further details of the code receiver block 34 will now be described, initially with reference to FIG. 3. As shown in FIG. 3, the code receiver block 34 includes a video signal cancellation circuit 38 (which includes a capability for compensating for cable length), a cable length determination circuit 40, a code detection circuit 42, a code latch 44 and a motor driver circuit 46. The video signal cancellation circuit 38 is connected to receive the above-mentioned signals respectively present at each side of the source termination resistance $R_s$, and operates to, in essence, cancel the video signal component of the signal present at the cable side of the source termination resistance $R_s$. The resulting signal is output from the video signal cancellation circuit 38 both to the cable length determination circuit 40 and to the code detection circuit 42. The cable length determination circuit 40 generates a 4-bit digital adjustment signal on the basis of the signal output from the video signal cancellation circuit 38 and the resulting adjustment signal is fed back to control the adjustable circuit component of the video signal cancellation circuit 38. The timing at which the cable length termination circuit 40 operates is based on the vertical synchronizing signal provided by the sync separator 36 (FIG. 2).

Continuing to refer to FIG. 3, the adjustment signal generated by the cable length determination circuit 40 is also supplied to the code detection circuit 42. As will be seen, certain elements of the code detection circuit 42 are adjusted on the basis of the adjustment signal in accordance with the detected length of the cable so that the code detection circuit 42 is in an appropriate condition to receive the signal output from the video signal cancellation 38. The code detection circuit 42 operates to detect the bits which constitute the camera control signals, which are present in the signal output from the video signal cancellation circuit 38. The control code signal bits detected by the code detection circuit 42 are then output to a conventional code latch 44, which operates at a timing based on the horizontal sync signals provided by the sync separator 36. The detected bits of the camera control signals are stored in the form of control code words at the code latch 44 and then output to a conventional motor driver 46, which in turn provides drive signals to the camera 24.

Figure 4:
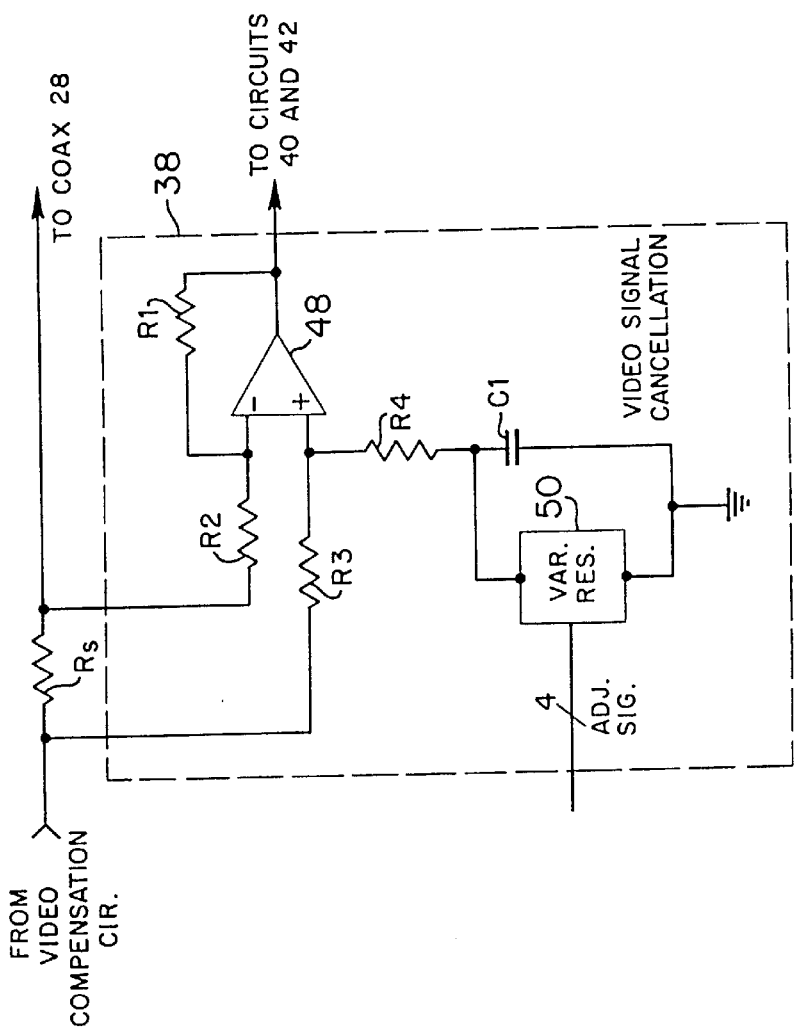
FIG. 4 is a schematic representation of a video signal cancellation/compensation circuit which constitutes a portion of the circuit of FIG. 3.

Further details of the video signal cancellation circuit will now be described with reference to FIGS. 4, 5A and 5B. As indicated in FIG. 4, the video signal cancellation circuit 38 includes an operational amplifier 48 configured as a differential amplifier with a digitally controlled variable resistance circuit 50 forming part of the gain-setting network for the op amp 48. In particular, the op amp 48 has a resistor R1 connected between the output of the op amp 48 and the inverting input of the op amp 48. In addition, a resistor R2 is connected between the inverting input of the op amp 48 and the cable side of the source termination resistance $R_s$. A resistor R3 is connected between the non-inverting input of the op amp 48 and the video compensation circuit side of the source termination resistance $R_s$. Also connected to the non-inverting input of the op amp 48 is a resistor R4, which is connected to ground through a parallel combination of the variable resistance circuit 50 and a capacitor C1.

An example of values for these components is as follows: R1=1 kilohm, R2=1 kilohm, R3=1.5 kilohm, R4=500 ohms, and C1=0.012 $\mu$F.

The differential amplifier constituting the video cancellation circuit 38 operates so that its output signal is provided according to the following formula:

Output of op amp 48=

Output of *op* amp 48 =

$$\left(1 + \frac{R1}{R2}\right)\left(\frac{Z_N}{R_3 + Z_N}\right)V1 - \left(\frac{R1}{R2}\right)V2, \text{where:}$$

$Z_N$ is the impedance of the network made up of R4, C1 and variable resistance 50;

$V_1$ is the level of the signal at the video compensation circuit side of source termination resistance $R_s$; and $V_2$ is the level of the signal at the cable side of the source termination resistance $R_s$.

Figure 5B:
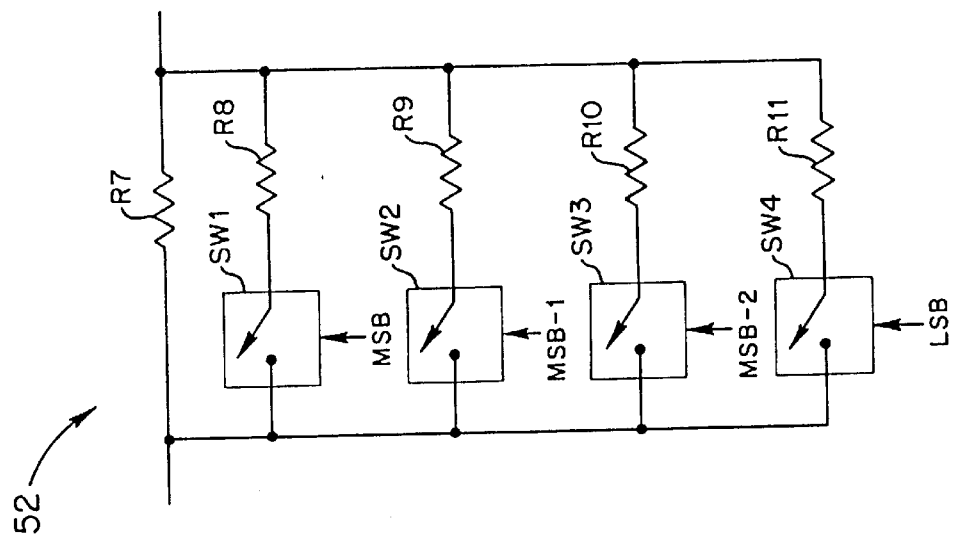

The variable resistance circuit 50 is shown in more detail in FIGS. 5A and 5B. In particular, in FIG. 5A it will be seen from FIG. 5A that the variable resistance circuit 50 includes a digitally controlled variable resistance network 52 is provided as part of an impedance translation arrangement that also includes an operational amplifier 54 as well as resistors R5 and R6. In the impedance translation arrangement which constitutes the variable resistance 50, the variable resistance network 52 is connected between the output and the inverting input of the op amp 54, and the non-inverting input of the op amp 54 is grounded. The resistor R5 is connected between the output of the op amp 54 and a node 56 which is the junction of resistor R4 and capacitor C1 (FIG. 4). The resistor R6 is connected between the node 56 and the inverting input of the op amp 54.

Details of the variable resistance network 52 are shown in FIG. 5B. It is to be noted that the network 52 is made up of resistors R7, R8, R9, R10 and R11, arranged in parallel with each other, but with each of the resistors R8, R9, R10 and R11 subject to being switched in or out of the network by switches SW1, SW2, SW3 and SW4, respectively. The switches SW1, SW2, SW3 and SW4 (which control whether the associated resistors are in or out of the network) are in turn controlled, respectively, by the most significant bit, the next most significant bit, the third most significant bit, and the least significant bit of the adjustment signal which is applied to the variable resistance network 52.

An example of the values for the resistors making up the network 52 is as follows: R7=1.2 megohm, R8=20 kilohm, R9=39 kilohm, R10=82 kilohm, and R11=160 kilohm. The adjustable resistive network 52 is formed of large-value resistors, and then configured within an impedance translation arrangement, so that incidental resistances such as the resistances of switches SW1–SW4 will only have a negligible effect upon the total effective resistance of the variable resistance circuit 50.

Figure 6:
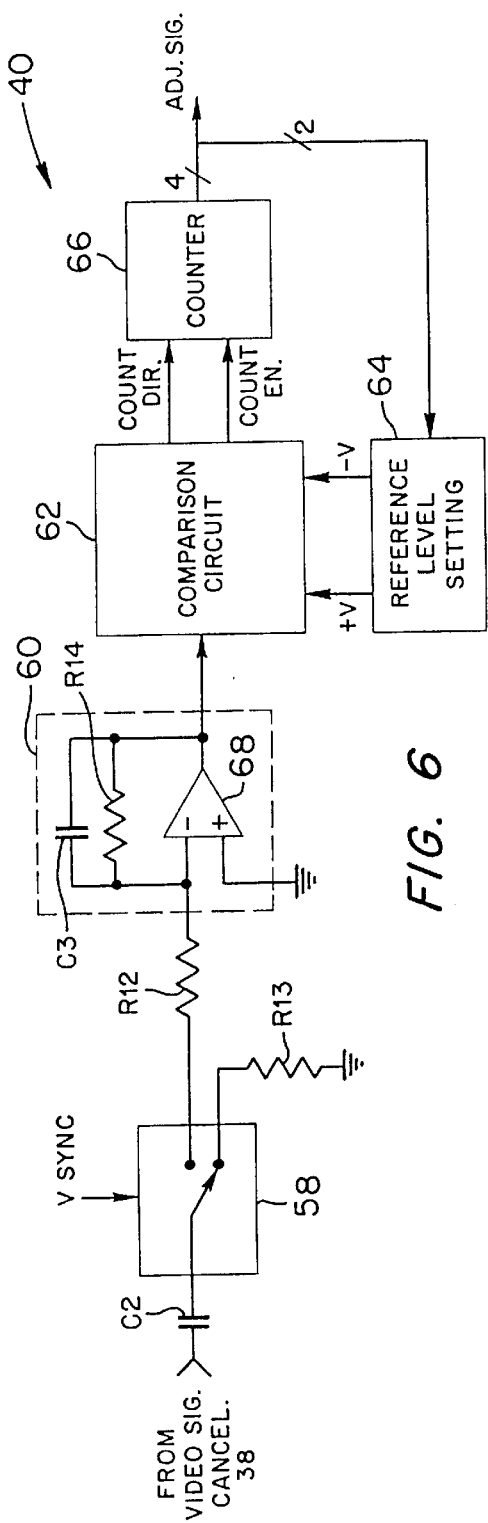
FIG. 6 is a block diagram of a cable length determination circuit which constitutes a portion of the circuit of FIG. 3.

Details of the cable length determination circuit 40 are shown in FIG. 6. Its shown in FIG. 6, the cable length determination circuit 40 includes a switch 58 having its input connected to the video signal cancellation circuit 38 through a capacitor C2. A first output of the switch 58 is connected through a resistor R12 to the input of an integrator circuit 60, and a second output of the switch 58 is grounded through resistor R13. The output signal from the integrator circuit 60 is provided as an input signal to a comparison circuit 62. The comparison circuit 62 compares the signal output from the integrator 60 with reference levels +V and −V provided by a reference level setting circuit 64. Based on the comparison of the integrator output with the reference levels, the comparison circuit 62 outputs a count direction signal and a count enable signal to a 4-bit digital counter 66. The 4-bit value held in the counter 66 is the previously mentioned adjustment signal to be output from the cable length determination circuit 40. In addition, the two most significant bits of the adjustment signal are fed back to the reference level setting circuit 64.

It will be observed that the integrator circuit 60 is shown as being made up of an operational amplifier 68 having its non-inverting input grounded and its inverting input connected through a resistor R12 to the first output of the switch 58. The op amp 68 has a capacitor C3 and a resistor R14 connected in parallel between the output of the op amp 68 and its inverting input. Following are examples of values of the capacitors and resistors shown in FIG. 6: C2=0.047 $\mu$F, C3=0.015 $\mu$F, R12=1 kilohm, R13=220 ohms, and R14=20 megohms.

Figure 7:
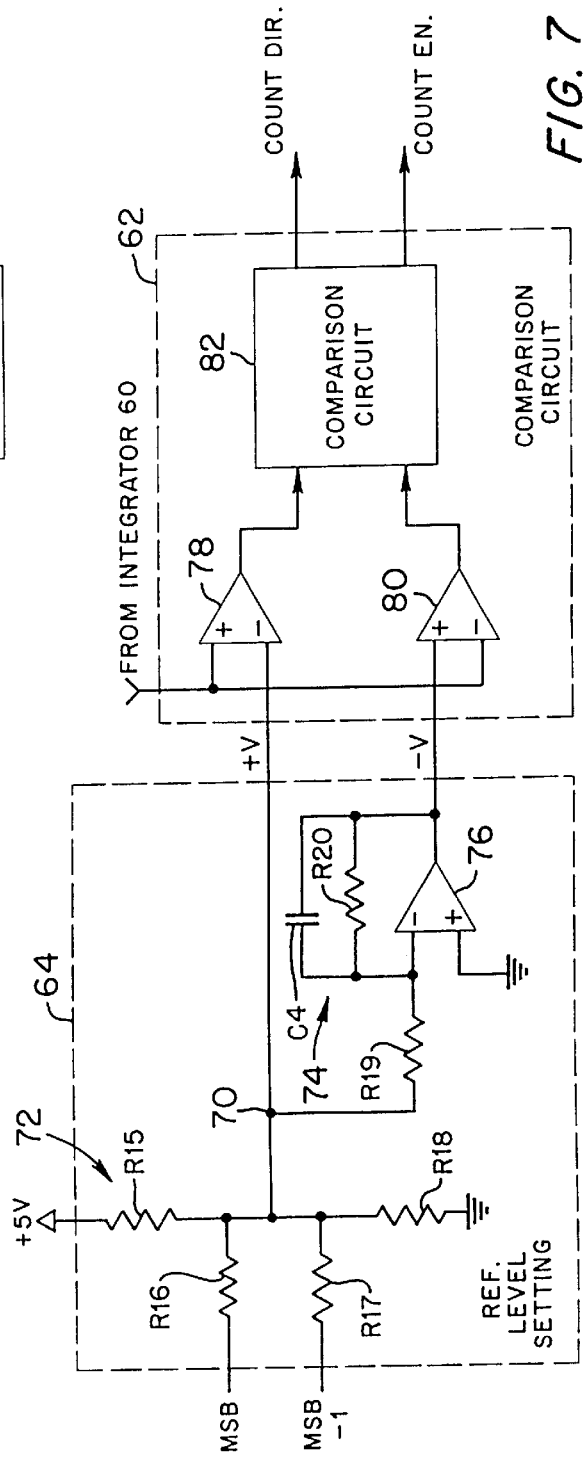
FIG. 7 shows details of portions of the circuit of FIG. 6.

Details of the comparison circuit 62 and the reference level setting circuit 64 will now be discussed with reference to FIG. 7. As seen from FIG. 7, the positive reference level +V output from the reference level setting circuit 64 is produced at an output node 70. The reference level +V is derived from a +5 volt source by means of a variable voltage divider 72. The voltage divider 72 is made up of resistors R15, R16, R17 and R18. The resistor R15 is connected between the output node 70 and the +5 volt source. The resistor R18 is connected between the output node 70 and ground. The two most significant bits of the adjustment signal output from the counter 66 (FIG. 6) are respectively connected to the output node 70 through resistors R16 and R17. The output reference level +V is controlled by the states of the two most significant bits of the adjustment signal, because, when the most significant bit is at a low level (0 volts) the resistor R16 is effectively in parallel with resistor R18, and the resistor R16 is effectively in parallel with resistor R15 when the most significant bit is at a high logic level (+5 volts). Similarly, the resistor R17 is effectively in parallel with resistor R18 when the next most significant bit is at a low level, and the resistor R17 is in parallel with the resistor R15 when the next most significant bit is at a high level. Examples of the values of the resistors making up the variable voltage divider 17 are as follows: R15=4.7 kilohms, R16=2.2 kilohms, R17=4.7 kilohms, and R18=100 ohms. As a result, the reference level +V is at about 0.1 V, 0.2 V, 0.3 V or 0.4 V, according to whether the digital value represented by the two most significant bits is "00", "01", "10", or "11". The positive reference level +V is converted into the negative reference level −V by means of an inverting amplifier 74 which is constituted by an operational amplifier 76, resistors R19 and R20 and capacitor C4. An example of the component values is as follows: R19=R20=10 kilohms, C4=0.047 $\mu$F.

The comparisons circuit 62 is made up of comparators 78 and 80 and a comparison logic block 82. The positive reference level +V is provided to the inverting input of the comparator 78, and the negative reference value −V is provide to the noninverting input of the comparator 80. The output signal from the integrator 60 is provided both to the noninverting input of the comparator 78 and to the inverting input of the comparator 80. The comparison logic block 82 receives the output signals from the comparators 78 and 80 and on the basis of those signals generates a count direction signal and a count enable signal which are provided to the counter 66. The comparison circuit 62 operates such that the counter 66 does not change its stored count value when the output signal from the integrator 60 is within the range around 0 volts defined by the reference values +V and −V. When the output from the integrator 60 is a positive level above +V the counter 66 is caused to count down. When the output signal from the integrator 60 is a negative level outside the range defined by the reference values +V and −V, the counter 66 is caused to count up. Sixteen consecutive counts in the same direction cause the count enable signal to be disasserted, thereby preventing the counter 66 from further counting.

The adjustment of the "no count" range of the reference level setting circuit 64 in response to the two most significant bits of the counter output (adjustment signal) causes the "no count" range to be relatively coarse for high values of the counter output and relatively fine for small values of the counter output.

Details of the code detection circuit 42 (FIG. 3) will now be described with reference to FIGS. 8–10. Referring initially to FIG. 8, it will be seen that the code detection circuit 42 is made up of a low pass filter 84 (formed of a resistor R21 and a grounded capacitor C5), a variable amplifier 86, a high pass filter 88 (formed of a capacitor C6 and a resistor R22 which is connected to a +5 volt source). The output of the high pass filter 88 is clamped to ground through a diode 90 and is also connected to the input of a comparator 92. A reference level $V_0$ is supplied to the comparator 92 by a reference level setting circuit 94. The reference level $V_0$ is generated by the reference level setting circuit 94 on the basis of the three least significant bits of the adjustment signal output from the cable length determination circuit 40 (FIG. 3). Following is an example of component values for the capacitor and resistors shown in FIG. 8: R21=150 ohms, C5=560 pF, c6=330 pF, R22=240 kilohms.

Continuing to refer to FIG. 8, it is noted that the variable amplifier 86 is provided to apply a gain factor to the signal output from the low pass filter 84, and the resulting amplified signal is then provided as an input to the high pass filter 88. The gain provided by the variable amplifier 86 is controlled on the basis of the most significant bit of the adjustment signal output from the cable length determination circuit 40.

Details of the variable amplifier 86 are shown in FIG. 9. As seen from FIG. 9, the amplifier 86 is made up of an operational amplifier 96 and resistors R23 and R24 which form a gain-setting network for the op amp 96. In addition, a switch 98 selectively switches a resistor R25 and a capacitor C7 into and out of the gain-setting network. When the most significant bit of the adjustment signal is "0" the switch 98 is in a position such that resistor R25 and capacitor C7 are included in the gain-setting network, but if the most significant bit is "1", resistor R25 and capacitor C7 are not part of the gain-setting network. An example of component values in the variable amplifier 86 is as follows: R23=1 kilohm, R24=3.9 kilohms, R25=680 ohm, and C7=4,700 pF. As a result, the switch 98 switches the variable amplifier 86 between a gain factor of about 5 and a gain factor of about 10.

FIG. 10 shows details of the reference level setting circuit 94, which includes a voltage divider formed of resistors R26, R27, R28, R29 and R30 connected in series between a −5 volt source and ground. The reference level $V_0$ is taken out from the junction of resistors R29 and R30. Switches 100, 102 and 104 are provided for selectively short circuiting resistors R26, R27 and R28, respectively. Each of the switches 100, 102 and 104 is controlled by the state of a respective one of the three least significant bits of the adjustment signal. The values of the resistors in the reference level setting circuit 94 may be as follows: R26=1.2 kilohm, R27=620 ohms, R28=270 ohm, R29=1.5 kilohm, R30=1 kilohm. According to this example, the reference level $V_0$ is settable to any one of eight steps, ranging from about 1 volt to 2 volts, in accordance with the count provided by the three least significant bits of the adjustment signal. Taken together, the one bit adjustment of the variable amplifier 86 and the three bit adjustment of the reference level setting circuit 94 permit the code detection circuit 42 to be adjustable in 16 steps for variations in the length of the coax cable 28. For example, in a preferred application of the invention, the code receiver and motor driver circuit 30 is installed with coax cabling ranging in length from very short cables (essentially 0 feet) to cables that are 3000 feet long. For detected cable lengths in the range of about 1500 to 3000 feet, the received code signals are amplified by a factor of approximately 10 at the variable amplifier 86. For shorter cable lengths, the code signals are amplified by a factor of about 5. In either case, the expected height of the code pulses received at the comparator 92 ranges from 2 volts to 4 volts, depending on the length of the cable. Accordingly, the reference level $V_0$ provided by the reference level setting circuit to the comparator 92 is set so as to be approximately one half the anticipated pulse amplitude level, on the basis of the three least significant bits of the adjustment signal, which corresponds to the length of the cable within either the 0 to 1500 foot range or the 1500 foot to 3000 foot range.

Details of the video compensation block 32 (FIG. 2) will now be described with reference to FIGS. 11 and 12. Referring initially to FIG. 11, it will be seen that the video compensation block 32 includes operational amplifiers 106 and 108 and a potentiometer 110 connected between the non-inverting input of op amp 106 and ground. The potentiometer 110, as will be seen, is subject to control by a three-bit digital signal, which is constituted by the three most significant bits of the adjustment signal output from the code receiver and cable length determination block 34 (FIG. 2). Continuing to refer to FIG. 11, an uncompensated video signal generated by the camera 24 is supplied to the non-inverting input of the op amp 106 through a resistor R31. The video signal from the camera 24 is also supplied directly to the non-inverting input of the op amp 108. A resistor R32 is connected between the output of op amp 106 and the inverting input of op amp 108. Also provided in parallel with the resistor R32 is a series combination of resistor R33 and capacitor C8. In addition, a resistor R34 is connected between the output of the op amp 108 and the inverting input of op amp 108. Although not shown in FIG. 11, is it also contemplated to provide another resistor-capacitor series arrangement between the output of op amp 106 and the inverting input of op amp 108, in accordance with the circuit arrangement shown in FIG. 5 of the above-referenced U.S. Pat. No. 4,996,497.

Following is an example of values of the components shown in FIG. 11: R31=330 ohms, R32=270 ohms, R33= 470 ohms, R34=470 ohms, and C8=4,700 pF.

Details of the potentiometer 110 are shown in FIG. 12. It will be noted that the potentiometer 110 is made up of an eight position switch 112 which has its input connected to the non-inverting input of op amp 106 and has its eight outputs respectively connected to ground through a short circuit connection 114 and to resistors R35, R36, R37, R38, R39, R40 and R41. The position of the switch 112 is controlled on the basis of the three most significant bits of the adjustment signal, which are supplied to the switch 112 as a control signal. Examples of the values of the resistors shown in FIG. 12 are as follows: R35=68 ohms, R36=200 ohms, R37=330 ohms, R38=620 ohms, R39=1 kilohm, R40=2.7 kilohms, and R41=4.7 kilohms. The switch 112 is operated so that the higher the value of the three bit control signal (i.e., the higher the value of the adjustment signal) the greater the resistance provided by the potentiometer 110. For example, if the three most significant bits of the adjustment signal have the value "000" then the non-inverting input of op amp 106 is effectively grounded. On the other hand, if the value of the three most significant bits of the adjustment signal is "111" then a resistance of 4.7 kilohms is provided between the non-inverting input of op amp 106 and ground. It is also contemplated to simply omit (i.e., to provide an open-circuit instead of) some of the larger-valued resistors connected to the switch 112. For example, it is contemplated to omit R41, or to omit both resistors R41 and R40.

Except for the above-described digitally controlled potentiometer which is automatically adjusted based on an electronically detected coax cable length, the theory of operation of the video compensation circuit 32 is explained in the above-reference U.S. Pat. No. 4,996,497, and therefore need not be further described.

An operation whereby the code receiver and cable length determination block 34 automatically detects the length of the coax cable 28 which will now be described. It is assumed that this operation is carried out as part of an installation or adjustment procedure and at a time when the camera 24 is providing a video signal to the video compensation circuit 32. As will be seen, in a preferred embodiment of the invention, only the portion of the video signal corresponding to the vertical synchronizing interval thereof is used for the cable length determination operation.

Referring to FIG. 2, a pre-emphasized video signal output from the video compensation block 32 is provided to the code receiver and cable length determination block 34 along with a signal present at the cable side of the source termination resistance $R_s$. Through operation of a feedback loop formed by the video signal cancellation circuit 38 (FIG. 3) and the cable length determination circuit 40, the block 34 operates to minimize the difference in level between the pre-emphasized video and the signal at the cable side of the source termination resistance $R_s$. In particular, the polarity of the signal output from the video cancellation circuit 38 (FIG. 4) is indicative of whether the variable resistance 50 is under-compensating or over compensating for the coax cable 28. The output from the video signal cancellation circuit 38 is provided, through gating switch 58 (FIG. 6), to the integrator 60. The switch 58 provides a gating function such that the signal from the cancellation circuit 38 is normally shunted to ground, but is supplied to the integrator 60 only during the vertical sync intervals of the input video signal. The output of the integrator 60 is provided to the comparison circuit 62, which, as noted before, causes the counter 66 to count up if the circuit 38 is over compensated by more than a reference amount (+V) and causes the counter 66 to count down if the circuit 38 is under compensated. If the output of the integrator 60 does not differ from zero by more than the reference level provided by the level setting circuit 64, then there is no change in the count stored in the counter 66. The degree of compensation required to be provided by the variable resistance 50 in order to properly compensate for the coax cable 28 is reflected by the adjustment signal output from the counter 66 and thus represents the length of the cable 28 on a 16 step (4 bit) scale. It will be noted that the adjustment signal is provided to the video compensation block 32 (FIG. 2) in addition to being used to control the variable resistance 50 of the video signal cancellation circuit 38. Thus, compensation is carried out in the video compensation block 32 in parallel with the compensation in the video signal cancellation circuit 38.

Although the above described operation performs the cable length determination and compensation on the basis of the vertical sync interval of the input video signal, it is also contemplated to use other standard portions of the input video signal, such as horizontal sync intervals, or to use a test signal for the cable length determination operation.

Because of the compensating adjustment to the video signal cancellation circuit 38, code signals transmitted through the cable 28 from the matrix switch 26, and present at the cable side of the termination resistor $R_s$, are readily detected in the signals output from the video signal cancellation circuit 38.

Operation of the code detection circuit 42 to detect code bits present in the signal output from the video signal cancellation circuit 38 will now be described with reference to FIG. 8. As is known to those who are skilled in the art, it is customary to transmit camera control code signals in synchronism with the input video signal, and, in particular, during a predetermined inactive line of the video signal. Referring to FIG. 8, the signal output from the video signal cancellation circuit 38 is conditioned by low pass filter 84 and high pass filter 88 and is amplified at variable amplifier 86. The resulting conditioned and amplified signal is provided to comparator 92, which detects code pulse transitions on the basis on the reference level provided by the level setting circuit 94. It is noted that the code detection circuit 42 is adjustable in accordance with the detected cable length, with the variable amplifier 86 providing a higher degree of amplification when the cable is found to be in the upper half of a predetermined range of cable lengths, and with the reference level set by the circuit 94 being reduced or raised, in accordance with whether the cable is relatively long or relatively short within either the upper or lower half of the range of cable lengths. It is to be recognized that instead of adapting the code detection circuit 42 to cable length both in terms of variable amplification and variable reference level, only one of variable amplification and variable reference level may be employed.

It is contemplated that the camera control code signals may be transmitted in the form of a conventional self-clocking signal, with "0" valued bits being represented by a one-third duty cycle pulse, and "1" valued bits being represented by a two-thirds duty cycle pulse. The pulse transitions detected through the code detection circuit 42 (comparator 92) are provided to the code latch 44 (FIG. 3). The code latch 44 receives the horizontal sync signal extracted from the input video signal by the sync separator 36 (FIG. 2) and operates in synchronism with the video input signal so that code bits are recognized and stored as soon as the predetermined inactive line interval containing the code signals is present. The latched code signals are then output from the code latch 44 to the motor driver 46 (FIG. 3), which provides control signals for the pan, tilt and zoom motors operable in connection with camera 24. The structure and operation of the code latch 44 and the motor driver circuit 46 are conventional, and therefore need not be described further.

The automatically adjusted compensation provided in the video signal cancellation circuit 38 reduces distortion in the code signal present at the cable side of the source termination resistance $R_s$, and improves the reliability of detection of the code signals. The adjustment to the code detection circuit 42 based on the detected length of the cable further adds to the reliability of code detection. Because the code can be more reliably detected than in prior art systems, a camera control signal with a lower degree of redundancy can be provided. For example, a command signal can be sent only once, and reliably received and implemented, instead of sending each command a large number of times, as has typically been done in prior art systems. As a result, camera control operation having a more rapid response can be realized with the cable detection and compensation system provided by the present invention. Moreover, longer and more complex commands can be reduced to a 15 bit word, which can be a command to direct the camera 24 to be automatically placed in a pre-programmed orientation and zoom condition. Pre-programmed camera movement patterns can also be actuated.

The present invention has, up to this point, been described in connection with an automatic determination of the length of the coax cable 28 through which video and control signals are transmitted. Noting that the transmission characteristics of a cable are affected by its gauge, component materials and other factors as well as its length, it should be understood that the present invention can be applied to detection of, and compensation for, cable gauge or other cable characteristics besides length.

Various changes to the foregoing video surveillance system and circuit arrangements, and modifications in the described practices, may be introduced without departing from the invention. The particularly preferred methods and apparatus are thus intended in an illustrative and not limiting sense. The true spirit and scope of the invention is set forth in the following claims.

What is claimed is:

1. In a video surveillance system comprising a remotely controllable video camera for generating a video signal, control means for generating camera control signals, a cable for transmitting to said video camera the camera control signals generated by said control means, and control signal receive means operatively associated with said video camera and connected to said cable for receiving said control signals transmitted via said cable, the improvement comprising:

an adjustable circuit element in said control signal receive means;

detection means connected to said cable for detecting a characteristic of said cable and for generating an adjustment signal indicative of said detected characteristic of said cable; and means for applying said adjustment signal to said adjustable circuit element in said control signal receive means, so as to adjust said control signal receive means in accordance with said detected characteristic of said cable.

2. An improvement in a video surveillance system according to claim 1, wherein said control signal receive means includes a video signal cancellation circuit and said video signal cancellation circuit includes said adjustable circuit element.

3. The improvement in a video surveillance system according to claim 2, wherein said detection means receives a signal output from said video signal cancellation circuit and detects said characteristic of said cable on the basis of said signal output from said video cancellation circuit.

4. The improvement in a video surveillance system according to claim 1, further comprising an adjustable video signal compensation circuit, connected between said video camera and said cable, for receiving said adjustment signal generated by said detection means and compensating said video signal in accordance with said detected characteristic of said cable.

5. The improvement in a video surveillance system according to claim 1, wherein said adjustment signal generated by said detection means is a digital signal.

6. The improvement in a video surveillance system according to claim 1, wherein said control signals generated by said control means include signals for controlling pan, tilt and zoom conditions of said video camera.

7. The improvement in a video surveillance system according to claim 1, wherein said detected characteristic of said cable is the length of said cable.

8. A self-compensating video signal cancellation circuit, comprising:
- a first input terminal for receiving a video signal at an input side of a cable source termination resistor;
- a second input terminal for receiving a video signal at an output side of said cable source termination resistor;
- an operational amplifier having a first input, a second input and an output;
- a first resistance connecting said first input of said operational amplifier to said first input terminal;
- a second resistance connecting said second input of said operational amplifier to said second input terminal;
- a third resistance connecting said output of said operational amplifier to one of said first and second inputs of said operational amplifier;
- an adjustable resistive network connected between ground and the other one of said first and second inputs of said operational amplifier;
- a detection circuit connected to the output of said operational amplifier for detecting a characteristic of a signal output from said operational amplifier and for generating an adjustment signal on the basis of the detected characteristic; and
- means for applying said adjustment signal to said adjustable resistive network to adjust a characteristic of said adjustable resistive network.

9. A self-compensating video signal cancellation circuit according to claim 8, wherein said first input of said operational amplifier is a non-inverting input, said second input of said operational amplifier is an inverting input, said third resistance connects said output of said operational amplifier to said second input of said operational amplifier, and said adjustable resistive network is connected between ground and said first input of said operational amplifier.

10. A self-compensating video signal cancellation circuit according to claim 8, wherein said adjustment signal is a digital signal and said adjustable resistive network includes a digital potentiometer to which said adjustment signal is applied.

11. A self-compensating video signal cancellation circuit according to claim 10, wherein said adjustable resistive network includes impedance translation circuitry associated with said digital potentiometer for translating an impedance level of said digital potentiometer, said translation circuitry including an operational amplifier and a feedback network connected to said digital potentiometer.

12. Apparatus for automatic video signal compensation, comprising:
a) a video camera for generating a video signal;
b) a cable through which said video signal is transmitted;
c) a detection circuit connected to said cable for detecting the length of said cable on the basis of a signal coupled to said cable and for generating an adjustment signal, said adjustment signal being indicative of the detected length of said cable; and
d) an adjustable compensation circuit for compensating said video signal in accordance with said adjustment signal generated by said detection circuit.

13. Apparatus according to claim 12, wherein said adjustable compensation circuit includes a digital potentiometer and said adjustment signal generated by said detection circuit is a digital signal which is applied to said digital potentiometer.

14. Apparatus according to claim 12, wherein said detection circuit includes a video signal cancellation circuit connected to receive a first signal present on a first side of a source termination resistance connected to said cable and a second signal present on a second side of said source termination resistance, said video signal cancellation circuit outputting a signal indicative of a difference between said first and second signals, said adjustment signal being generated on the basis of said signal output by said video signal cancellation circuit.

15. Apparatus according to claim 14, wherein said video signal cancellation circuit includes an adjustable resistive network and said adjustment signal is applied to said adjustable resistive network to adjust a characteristic of said adjustable resistive network.

16. Apparatus for automatic video signal compensation, comprising:
a) a video camera for generating a video signal;
b) a cable through which said video signal is transmitted;
c) a video signal cancellation circuit connected to receive a first signal present on a first side of a source termination resistance connected to said cable and a second signal present on a second side of said source termination resistance, said video signal cancellation circuit outputting a signal indicative of a difference between said first and second signals;
d) adjustment signal means for generating an adjustment signal on the basis of said signal outputted by said video signal cancellation circuit; and
e) an adjustable compensation circuit for compensating said video signal in accordance with said adjustment signal generated by said adjustment signal means.

17. Apparatus according to claim 16, wherein said adjustable compensation circuit includes a digital potentiometer and said adjustment signal generated by said adjustment signal means is a digital signal which is applied to said digital potentiometer.

18. Apparatus according to claim 16, wherein said video signal cancellation circuit includes an adjustable resistive network and said adjustment signal is applied to said adjustable resistive network to adjust a characteristic of said adjustable resistive network.

19. An apparatus for receiving camera control code signals in a video surveillance system in which video signals and said camera control signals are transmitted in opposite directions through a single cable, the apparatus comprising:
a) a video signal cancellation circuit connected to receive a first signal present on a first side of a source termination resistance connected to said cable and a second signal present on a second side of said source termination resistance, said video signal cancellation circuit outputting a difference signal indicative of a difference between said first and second signals, said video cancellation circuit including an adjustable resistive network for adjusting a characteristic of said video cancellation circuit;

b) a cable characteristic determination circuit for receiving said difference signal outputted by said video cancellation circuit, determining a characteristic of said cable on the basis of said difference signal, and generating an adjustment signal on the basis of said difference signal, said adjustment signal being applied to said adjustable resistive network of said video cancellation circuit so as to adjust said resistive network according to the determined characteristic of said cable; and c) a code detection circuit for receiving said difference signal output from said video signal cancellation circuit and processing said difference signal to detect said camera control code signals transmitted through said cable.

20. An apparatus according to claim 19, wherein said video signal cancellation circuit includes an operational amplifier configured as a differential amplifier for forming said difference signal from said first and second signals, with said adjustable resistive network connected to an input of said operational amplifier.

21. An apparatus according to claim 20, wherein:

said adjustment signal is a digital signal; and said adjustable resistive network includes a digital potentiometer to which said adjustment signal is applied and impedance translation circuitry associated with said digital potentiometer for translating an impedance level of said digital potentiometer, said translation circuitry including an operational amplifier and a feedback network connected to said digital potentiometer.

22. An apparatus according to claim 21, wherein said cable characteristic determination circuit includes:

processing means for processing said difference signal outputted by said video cancellation circuit to form a processed difference signal;

comparison means for comparing said processed difference signal with a reference level and for forming a comparison signal indicative of a result of said comparison; and a digital counter for forming said adjustment signal in response to the comparison signal formed by said comparison means.

23. An apparatus according to claim 22,. wherein said cable characteristic determination circuit further includes level variation means associated with said comparison means for receiving said adjustment signal and varying said reference level in accordance with said adjustment signal.

24. An apparatus according to claim 19, wherein said code detection circuit includes:

processing means for processing said difference signal outputted by said video cancellation circuit to form a processed difference signal;

comparison means for comparing said processed difference signal with a reference level to detect bits constituting said camera control code signals.

25. An apparatus according to claim 24, wherein:

said adjustment signal is a multi-bit digital signal;

said processing means includes a variable amplifier for applying to said difference signal a gain selected from a plurality of gains on the basis of at least one bit of said multi-bit digital signal; and said code detection circuit further includes level variation means associated with said comparison means for receiving at least one other bit of said multi-bit digital signal and varying said reference level in accordance with said at least one other bit of said multi-bit digital signal.

26. An apparatus according to claim 19, wherein the characteristic of said cable determined by said cable characteristic determination circuit is the length of said cable.

27. A method of compensating for variations in cable length in a closed-circuit video surveillance system, comprising the steps of:

providing an adjustable video signal compensation circuit connected between a video camera and a cable through which video signals generated by said camera are transmitted;

connecting to said cable a detection circuit for detecting a characteristic of said cable;

generating an adjustment signal in said detection circuit; and applying said adjustment signal to said adjustable video signal compensation circuit so as to compensate said video signals according to the characteristic of the cable detected by the detection circuit.

28. A method according to claim 27, wherein said adjustment signal is a digital signal indicative of a length of said cable.

29. A method according to claim 27, wherein said generating step includes receiving said video signals generated by said camera.

30. A method according to claim 27, wherein the characteristic of the cable detected by the detection circuit is the length of the cable.

31. A method of receiving a camera control signal transmitted to a video camera through a cable used for transmission of a video signal generated by said camera, the method comprising the steps of:

receiving a first signal which includes both said video signal and said camera control signal;

detecting a characteristic of the cable;

adjusting a differential amplifier on the basis of the detected characteristic of the cable; and subtracting the first signal from a second signal by means of the adjusted differential amplifier.

32. A method according to claim 31, wherein said detecting step includes processing a signal output from the differential amplifier and comparing the processed signal with a reference level.

33. A method according to claim 31, wherein said detecting step includes detecting the length of the cable.

34. A method of receiving a camera control signal transmitted to a video camera through a cable used for transmission of a video signal generated by said camera, the method comprising the steps of:

providing a control signal receive circuit to separate the camera control signal from the video signal;

detecting a characteristic of the cable; and adjusting an adjustable circuit element in said control signal receive circuit on the basis of the detected characteristic of the cable.

35. A method according to claim 34, wherein said detecting step includes processing a signal present in the cable.

36. A method according to claim 34, wherein said detecting step includes detecting the length of the cable.

* * * * *

UNITED STATES PATENT AND TRADEMARK OFFICE
CERTIFICATE OF CORRECTION

PATENT NO. : 5,805,202
DATED : September 8, 1998
INVENTOR(S) : Christopher M. Mullins, et. al.

It is certified that error appears in the above-identified patent and that said Letters Patent is hereby corrected as shown below:

Column 17, line 48, delete "." (second occurrence)

Signed and Sealed this

Ninth Day of February, 1999

Attest:

*Attesting Officer*

*Acting Commissioner of Patents and Trademarks*